(12) United States Patent
Meli

(10) Patent No.: US 7,155,597 B1
(45) Date of Patent: Dec. 26, 2006

(54) DATA PROCESSING DEVICE WITH ALIASED DATA POINTER REGISTER

(75) Inventor: Louis M. Meli, Kuesnacht (CH)

(73) Assignee: NXP B.V., Eindhoven (NL)

( * ) Notice: Subject to any disclaimer, the term of this patent is extended or adjusted under 35 U.S.C. 154(b) by 520 days.

(21) Appl. No.: 09/313,037

(22) Filed: May 17, 1999

(51) Int. Cl.
*G06F 12/00* (2006.01)
(52) U.S. Cl. ...................................... 711/217
(58) Field of Classification Search ............... 710/2; 711/217; 365/230.02, 239
See application file for complete search history.

(56) References Cited

U.S. PATENT DOCUMENTS

| | | | | |
|---|---|---|---|---|
| 4,782,439 A | * | 11/1988 | Borkar et al. .................. | 710/22 |
| 5,047,922 A | * | 9/1991 | Borkar ........................... | 710/2 |
| 5,317,750 A | * | 5/1994 | Wickersheim et al. ........ | 712/39 |
| 5,426,769 A | * | 6/1995 | Pawloski ........................ | 710/2 |
| 5,657,288 A | * | 8/1997 | Dent .............................. | 365/230.02 |

FOREIGN PATENT DOCUMENTS

GB     2 200 818 A    *    8/1988

OTHER PUBLICATIONS

Dallas Semiconductor, "DS87C550 Data Sheet", Sep. 1998.*
Dallas Semiconductor DS87C550 Product Preview (Sep. 16, 1998).

* cited by examiner

*Primary Examiner*—Mano Padmanabhan
*Assistant Examiner*—Paul Baker
(74) *Attorney, Agent, or Firm*—Peter Zawilski

(57) ABSTRACT

A data processing device has load and store instructions which address memory with the content of a data pointer register. In a normal mode, the same data pointer register is used for all load and store instructions. In this mode the processor is compatible with a older processor design. In a special mode, at least two different registers are used alternately to address memory when memory access instructions are executed. A control register controls whether or not the different registers are updated as part of the memory access instructions. Preferably, the control register provides for more than one different kind of update of the different registers, such as post addressing increment, post addressing decrement etc.

10 Claims, 1 Drawing Sheet

DATA PROCESSING DEVICE WITH ALIASED DATA POINTER REGISTER

FIELD OF THE INVENTION

The invention relates to a data processing device and a data processing system containing such a device.

BACKGROUND OF THE INVENTION

A prior art data processing device is a 8051 compatible microcontroller known from the Dallas semiconductors DS87C550, as described in a product preview data sheet dated Sep. 16, 1998.

The original 8051 was a very simple machine, with a limited instruction set. The DS87C550 provides an extension of the original 8051, while maintaining compatibility with the original 8051 (i.e. the DS87C550 executes 8051 programs with the same effect as the 8051). The extension concerns the data pointer register of the original 8051. The original 8051 had a single data pointer register DPTR. The DPTR register is used in MOVE instructions to move data between register and memory locations. The DPTR contains an address that the processor uses to address memory used in the MOVE instructions. Data from a succession of addresses can be moved to register and processed by executing successive MOVE instructions, each followed by incrementation of the address in the DPTR register.

The 8051 had a DPTR increment instruction INC for incrementing the DPTR. But the 8051 did not have the possibility to decrement the DPTR. The DS87C550 improves this. The DS87C550 introduces an instruction-settable control bit which controls whether the processor responds to the 8051 DPTR increment instruction by incrementing the DPTR or by decrementing the DPTR.

The original 8051 only had a single DPTR register. If the original 8051 had to transfer data from a first series of memory locations to a second series of memory locations with MOVE instructions, the address in the DPTR register had to be replaced alternately with an address for addressing the first series and an address for addressing the second series. This caused considerable instruction overhead. The Dallas DS87C550 reduces this overhead. Two registers are provided instead of the single DPTR, one register for addressing memory in moves to memory and one for move from memory. In a toggle mode, the DS87C550 uses alternately one register and the other, e.g. in MOVE or INC instructions.

A program for transferring data using the Dallas 8051 can move data from one memory region to another by executing the following instruction sequence repeatedly:

| | |
|---|---|
| MOV A,@DPTR | loads A from memory address pointed at by first DPTR |
| MOV @DPTR,A1 | stores A to memory address pointed at by second DPTR |
| INC DPTR | increments or decrements first DPTR |
| INC DPTR | increments or decrements second DPTR |

Each of these instructions has the side effect that the next instruction will use a different one of the registers. Thus, the overhead needed to reload addresses into the DPTR register is avoided. However, the instruction sequence that must be repeated still contains four instructions.

SUMMARY OF THE INVENTION

Amongst others, it is an object of the invention to provide a processing device with further reduced overhead needed to transfer data between different memory locations, while maintaining compatibility with a processor that uses a predetermined register to address memory.

The processing device according to the invention is set forth in Claim 1. According to the invention, the processing device has an instruction-settable control register that controls whether or not a DPTR value is updated as a side effect of a data transfer instruction. Thus, the effect of the data transfer instruction of the original 8051 without update is preserved in one state of the control register, but in another state updates are made so that a minimum number of instructions is needed to transfer data.

In an embodiment the addresses are updated as a side effect of memory access instructions. Only the address that is actually used is updated. Preferably, the type of update for different ones of the addresses is controlled independently under program control.

Preferably the memory access instructions comprise load and store instructions. Thus alternately executed load and store instructions will use independent addresses without explicit references to different address registers, or additional instructions to switch between addresses.

The number of addresses that the processing device holds in parallel for use in memory access instructions may be two or higher.

Preferably, automatic switching between different addresses can be enabled and disabled under program control.

BRIEF DESCRIPTION OF THE DRAWING

These and other advantageous aspects of the invention will be illustrated with a non-limiting example using the following figure.

DETAILED DESCRIPTION

Figure 1:
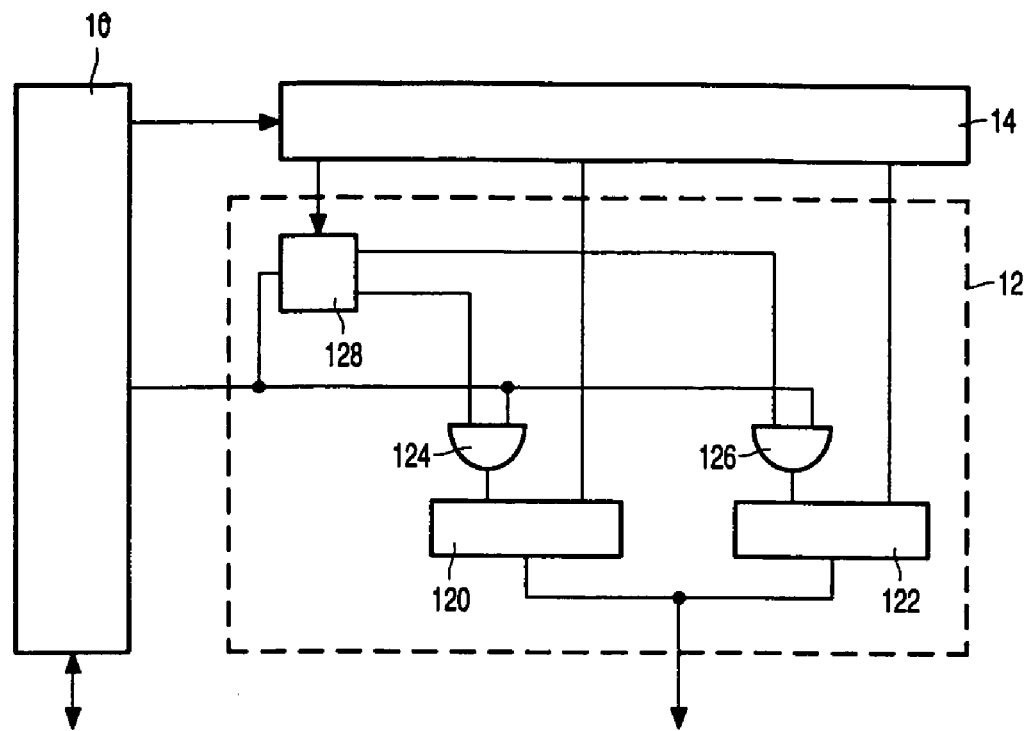
FIG. 1 shows a processing device

The processing device supports the execution of a program wherein the transfer of data from a memory location with an address A1 to a memory location with an address A2 can be executed with the following program fragment

| | |
|---|---|
| | MOV CTRL,#1 |
| | MOV DPSEL,#1 |
| | MOV DPTR,#A2 |
| | MOV DPSEL,#2 |
| | MOV DPTR,#A1 |
| L1: | MOV A,@DPTR |
| L2: | MOV @DPTR,A |

Here the move instruction MOV always moves data specified by the second operand to a location specified the first operand. "#" denotes that the data is the numerical value represented by the following symbol. "@" denotes that the following symbol represents a location from which an address of a memory location for the data has to be fetched. "A" denotes the accumulator register, DPTR a data pointer register, DPSEL a first control register and CTRL a second control register. L1, L2 are labels of instructions.

In principle, the program fragment shown may be followed by a series of MOV A,@DPTR; MOV @DPTR,A instruction pairs or a loop back to the instruction labeled L1.

The processing device holds a first and second address in parallel, for use as address when the DPTR register is specified as the location from which the address for memory access is to be fetched. During the execution of a series of instructions that refer to the DPTR the first and the second address are accessed alternately as DPTR value.

As a result in the example the address A1 is used in the instruction labeled L1 and in the instruction L2 the address A2 is used, even though both instructions appear to refer to the same DPTR. The change from one address to the other is implemented as a side-effect of executing the instruction labeled L1. The change back is a side-effect of the instruction labeled L2.

In the example, the processing device moves a value of 1 to a control register in response to the first instruction. This value causes the processing device to enable the alternating between the first and second addresses. In addition the control register may control updates of the first and second address, such as incrementation after use.

In response to the second instruction the processing device moves a value of 1 to a selector register. This value causes the processing device to receive the first address when a value is loaded subsequently into the data pointer register DPTR. The third instruction commands the move of an address value A2 to the data pointer register DPTR. Because the selector register has been set to 1, the processing device will use this address value A2 as the first address.

The fourth instruction causes the processing device to move a value of 2 into the selector register. This value causes the processing device to receive the second address when a value is loaded subsequently into the data pointer register DPTR. The fifth instruction commands the move of an address value A1 to the data pointer register DPTR. Because the selector register has been set to 2, the processing device will use this address value A1 as the second address. Subsequently, the processing device will use alternately the first and the second address (updated if necessary) when memory access instructions refers to the DPTR.

There exist many ways of implementing these changes between addresses.

FIG. 1 shows an example of a processing device for implementing such changes; only parts involved with the invention are shown. The processing device contains an instruction execution unit 10, an address selector circuit 12 and a control register 14.

The execution unit 10 has data and control connections for a memory (not shown) and connections to the address selector circuit 12 and control register 14. The address selector circuit 12 contains a first and second address register 120, 122, both coupled to an address output of the processing device. The address selector circuit 12 contains a register selector register 128 and first and second AND gates 124, 126. Complementary outputs of the register selector register 128 are coupled to a first input of the first and second AND gate 124, 126 respectively. An output of the first and second AND gate 124, 126 is coupled to an enable input of the first and second register 120, 122 respectively. An address enable output of the instruction execution unit 10 is coupled to a second input of the first and second AND gate 124, 126.

A control register setting output of the instruction execution unit 10 is coupled to the control register 14, which has a control outputs coupled to the register selector register 128 and to increment enable inputs of the first and second register 120, 122. Connections to the registers 120, 122 for loading initial addresses into the registers under control of instructions executed by the execution unit 10 have been omitted in FIG. 1 for the sake of clarity.

In operation the execution unit 10 executes a sequence of instructions. Each time that such an instruction refers to a data pointer register for specifying a memory address for memory access, the execution unit supplies an address enable signal on the address enable output to the address selector circuit. The register selector register 128 controls which one of the registers 120, 122 receives this address enable signal. This control is effect via the AND gates 124, 126. The enabled register 120, 122 will supply its content as an address to the address output of the processing device.

The control register 14 enables or disables toggling of the register selector register 128. If a toggle control bit in the control register 14 is set, a toggle enable signal is supplied to the register selector register 128. In response, the register selector register 128 will toggle each time an address enable signal is supplied by the execution unit 10, thus alternately selecting the first and second register 120, 122.

If the control bit is cleared, the register selector register 128 will not toggle and the same register 120, 122 will always be used to provide addresses if the execution unit 10 enables the address. Preferably, the setting of the control register 14 also controls which one of the registers 120, 122 the register selector register 128 enables absent toggling.

When the register 120, 122 that receives the address enable signal supplies its content to the address output, that register 120, 122 updates its content under control of a control signal from the control register 14. Examples of different updates are no-update, post-increment (add one address unit after supplying the content to the address output), post-decrement etc. The content of the control register 14 determines which update is executed.

Different types of control over the update are possible. In a preferred embodiment, the control register 14 has separate fields for controlling the updates of different ones of the registers 120, 122. Thus, independent control signals are supplied to each of the registers. As a result, in operation, the setting of the control register 14 may provide that both registers 120, 122 are post-incremented when they receive an address enable. This allows for moving data from one series of addresses in memory to another series of addresses with the following instructions:

|  | MOV CTRL,#1\|INC1\|INC2 |
|  | MOV B,#N |
| L1: | MOV A,@DPTR |
|  | MOV @DPTR,A |
|  | DEC B |
|  | JUMPGE L1 |

Here the instructions from L1 are repeated until the counter B has counted down from N to 0. The first instruction sets the control register to a combination of values that cause the registers 120, 122 to be used alternately and post-incremented. Of course, different control registers, that can be set in different instructions can be used for this purpose as well.

Alternatively, the setting of the control register 14 may provide for post-incrementing the content of one register when it receives an address enable, and keeping the content of the other register fixed when it receives an address enable. This can be used for example for transferring data from a series of memory address to a memory mapped I/O port, or vice versa. Only the setting of the control register is different between the program code for such a transfer and the program code with post-increment on both registers.

In a further alternative, the setting of the control register 14 may provide for post-incrementing the content of one register when it receives an address enable, and post-decrementing the content of the other register when it receives an address enable. This may be used to move data from one series of addresses in memory to another in reverse order. Only the setting of the control register is different between the program code for such a transfer and the program code with post-increment on both registers.

Without deviating from the invention however, one may also supply the same control signal to both registers 120, 122 so that both are updated in the same way, or omit the control over updating altogether, using a fixed update like post-increment. Also, instead of using independent fields for update control signals for both registers, one may use one field which can be set to a number of states to select one of a number of combinations of possibly different control signals for the two registers 120, 122.

Of course, implementation of the invention is not limited to the embodiment shown in FIG. 1. For example, instead of connecting both registers to the address output and enabling different ones of these registers 120, 122, one may place these registers in a circular shift register arrangement. In this shift register arrangement the content of the first register 120 is loaded into the second register 122, and the old content of the second register 120 is loaded into the first register 120 each time after the execution unit 10 supplies an address enable signal. Thus, only the first register 120 needs to be connected to the address output and the content of the first register is always output in case of an address enable signal. Updates are also applied only to the content of the first register 120, the type of update preferably being dependent on content of the control register for the particular address that is in the first register 120.

Figure 2:
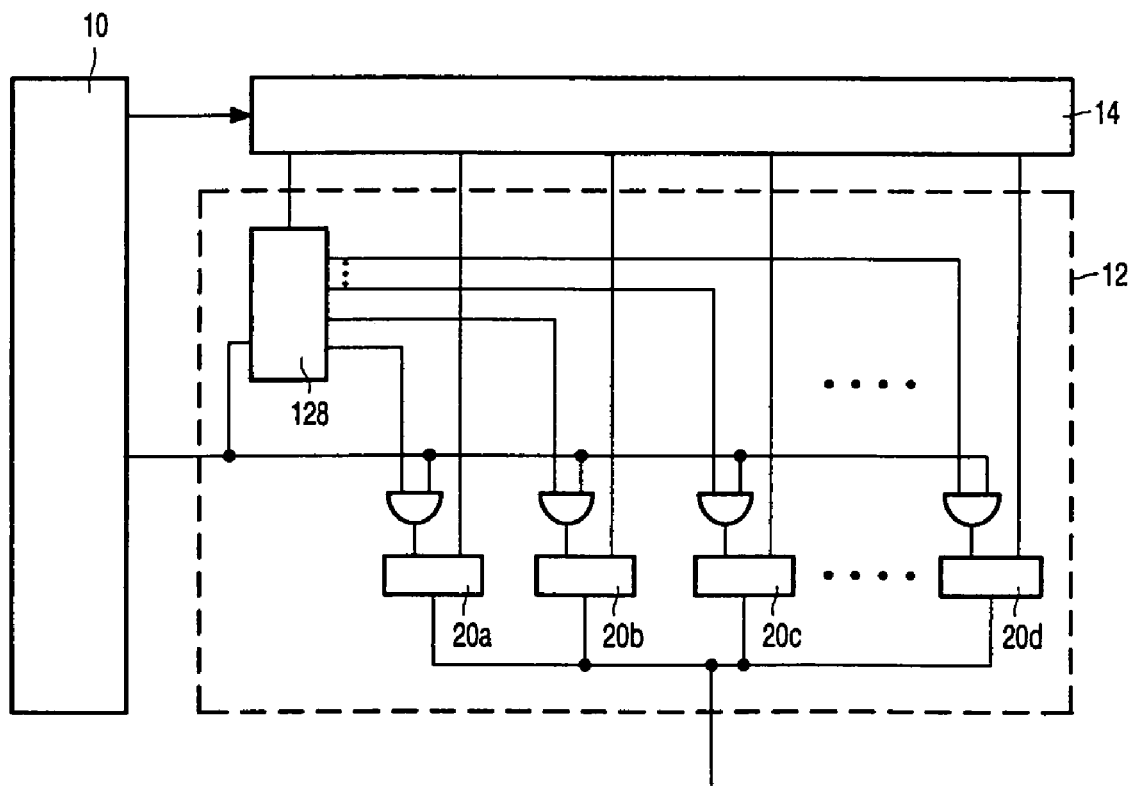
FIG. 2 shows a further processing device.

FIG. 2 shows a processing device like that of FIG. 1, where instead of two registers 120, 122 a greater number of registers 20a–d is used. In this case the register selector register 128 is altered so that it has a respective selection output for each of the registers. Instead of the toggling between two registers, the register selector now cycles through states in which more than two successive ones of the registers are selected so that they receive an address enable signal from the execution unit 10 successively. This may be realized for example by using a Johnson counter for the register selector register 128, or a normal counter followed by a register selection decoder.

This can be used for example to create multiple copies of a sequence of memory locations, by repeating a sequence of instructions

| | |
|---|---|
| L1: | MOV A,@DPTR |
| | MOV @DPTR,A |
| | MOV @DPTR,A |

In each instruction, the processor uses a different one of the address pointers to address memory.

In an embodiment, the control register 14 also controls the number of different registers that the register selector register 128 selects before it again selects the first register 120. Thus, selection may cycle through two registers 120, 122 or through three registers etc., the number of registers in the cycle being dependent on the content of the control register.

| | |
|---|---|
| | MOV CTRL,#CYCLE_3 |
| | MOV B,#N |
| | MOV A,@DPTR |
| | MOV @DPTR,A |
| L1: | MOV @DPTR,A |
| | DEC B |
| | BNE L1 |

In the example above, one would sets the control register to a cycle of three registers.

Preferably updates are controlled for different registers independently with the control register 14. In this case, for example, the following program code may be used

| | |
|---|---|
| | MOV CTRL,#CYCLE_3|INC1|INC2|INC3 |
| | MOV B,#N |
| L1: | MOV A,@DPTR |
| | MOV @DPTR,A |
| | MOV @DPTR,A |
| | DEC B |
| | BNE L1 |

The first instruction programs that three different registers are used in cyclical succession when DPTR is used to access memory in the three MOV instructions after the label L1. Moreover the first instruction ensures that all three of these registers are incremented after each memory access addressed with the relevant register.

The example of code copies the content of a series of successive memory locations to two other series of successive memory locations. With different update control signals, other effects may be realized with the same instructions as from the label L1. For example, the control register might by set so that the register used to address load data is not updated. In this case data from one location is copied to the two series of memory locations, of if the load address is mapped to an input port, data from the input port is copied to two series of locations. In another example, the control register might be set so that one of the registers used to address store data is not updated. In this case, data is copied to a series of locations and written a number of times to the same location, or if the store address is mapped to an output port, data is copied and written to the output port. In a combination of the examples, data from an input port is copied and written to an output port.

Without deviating from the inventions other variations with respect to FIG. 1 can be considered. For example instead of using the address directly to address memory, an instruction-determined offset may be added to the content of the registers to generate the actual address for the memory.

As a result of the invention a processor that is compatible with a much simpler processor, such as the 8051, may be used to transfer data with a reduced number of instructions.

The invention claimed is:

1. A data processing device, comprising
    a register circuit for storing at least two addresses in parallel;
    an address selector arranged to cycle through a set of states in which respective ones of the at least two addresses become a currently selected address respectively;
    an instruction execution unit having an instruction set that contains a memory access instruction, execution of the memory access instruction causing the instruction execution unit to issue memory access signals with an access address determined from the currently selected address, execution of the memory access instruction further causing the address selector to cycle to a next one of the states; and a control register that is instruction-settable to respective control states that control whether or not the processing device updates the at least two addresses as a side-effect of executing the memory access instruction.

2. The data processing device as claimed in claim 1, wherein each control state specifies respective update actions for all of the at least two addresses.

3. The data processing device as claimed in claim 1, wherein the control states specify a choice from at least no-update, update by incrementing with a predetermined value and update by decrementing with the predetermined value.

4. The data processing device as claimed in claim 1, wherein the execution of said memory access instruction further causes the instruction execution unit to perform, upon the currently selected address, the update action that is specified by the control state of the control register for that one of the at least two addresses that is the currently selected address.

5. The data processing device as claimed in claim 1, wherein the instruction set includes a load from memory instruction and a store to memory instruction for causing the instruction execution unit to respond to the execution of said memory access instruction.

6. A data processing system comprising a data processing device as claimed in claim 5, programmed with a program for executing alternately the load from memory instruction and the store to memory instruction, for an address addressed by a first one and a second one of the at least two addresses respectively, after setting the control register to one of control states that causes both the first one and the second one of the addresses to be updated.

7. A data processing system comprising a data processing device as claimed in claim 5, programmed with a program for executing alternately the load from memory instruction and the store to memory instruction, for an address addressed by a first one and a second one of the at least two addresses respectively, after setting the control register to one of control states that causes only one of the first or second one of the addresses to be updated.

8. The data processing device as claimed in claim 1, wherein the address selector cycles back and forth between states that select a first and second one of the at least two addresses respectively.

9. The data processing device as claimed in claim 1, wherein the register circuit stores at least three addresses, and the address selector cycles through a series of at least three states that select different ones of the at least two addresses.

10. A data processing device, comprising
a register circuit for storing at least two addresses in parallel;
an address selector including a register selector register and a logic circuit collectively arranged to cycle through a set of states in which respective ones of the at least two addresses become a currently selected address respectively;
an instruction execution unit having an instruction set that contains a memory access instruction, execution of the memory access instruction causing the instruction execution unit to issue memory access signals with an access address determined from the currently selected address, execution of the memory access instruction further causing the address selector to cycle to a next one of the states; and
a control register in communication with said register selector register and said logic circuit, said control register being instruction-settable to respective control states that control whether or not the processing device updates the at least two addresses as a side-effect of executing the memory access instruction.

* * * * *